Aug. 15, 1961 D. A. PAYNTER 2,996,641

CATHODE RAY TUBE DEFLECTION CIRCUIT

Filed Jan. 30, 1957 2 Sheets-Sheet 1

INVENTOR:
DONALD A. PAYNTER,
BY Donald N. Timbie
HIS ATTORNEY.

INVENTOR:
DONALD A. PAYNTER,
BY Donald N. Timbie
HIS ATTORNEY.

United States Patent Office 2,996,641
Patented Aug. 15, 1961

2,996,641
CATHODE RAY TUBE DEFLECTION CIRCUIT

Donald A. Paynter, Syracuse, N.Y., assignor to General Electric Company, a corporation of New York Filed Jan. 30, 1957, Ser. No. 637,178
12 Claims. (Cl. 315—27)

Figure 1:
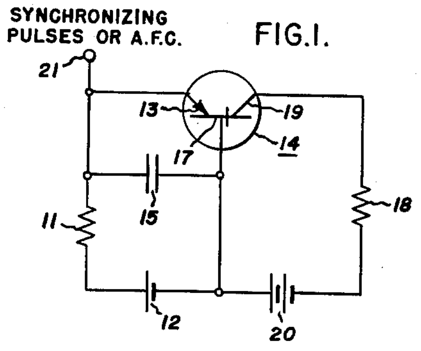

The present system relates to a transistorized circuit for providing a current for the deflection yoke of a cathode ray tube electromagnetic deflection system.

One of the next big developments in the television field is a practical transistorized television set. Work on this development is going on at a rapid rate because transistors have many advantages over vacuum tubes. Transistors are lighter, smaller, they have a much longer life, and they consume much less power to do the same job; to mention only a few of the more well-known advantages. In many circuits the substitution of transistors for tubes requires very little circuit modification and innovations because only the tube-like characteristics of the transistors are utilized. It has been recently appreciated that the transistor has useful characteristics of its own that do not have vacuum-tube counterparts. Two such characteristics are the recovery time current flow in the collector circuit after the emitter circuit has been biased off and also the bidirectional current flow that can occur between all of the electrodes under suitable conditions. To use some such characteristics, special circuits have to be designed; circuits for which there are no vacuum tube counterparts. The present invention is such a circuit that has been designed to utilize the unique characteristics of transistors in the circuit of a cathode ray tube electromagnetic deflection system.

Accordingly, an object of the present invention is to provide a deflection circuit that is smaller, lighter, more durable and which consumes less energy than does a vacuum tube deflection circuit.

Another object of the present invention is to provide an improved deflection system that utilizes only transistors for the active elements.

A further object of the present invention is to provide an improved all-transistorized deflection system that utilizes the unique properties of transistors to produce deflection.

It is well known that the current through a television deflection yoke should have a sawtooth wave shape. It is also well known that if a source of D.-C. voltage is applied across a yoke that has a large inductive reactance as compared to the resistance, the current increases linearly. The present invention is an oscillatory switch that connects a source of D.-C. potential across the deflection yoke to cause a linear increase of current in the yoke. After a predetermined time this switch shuts off. The deflection yoke then acts as an inductor in a parallel resonant circuit to produce a current interchange with its distributed capacitance, if the amount of that capacitance is sufficient. If it is not sufficient, additional capacitance can be placed in parallel with the yoke. After a half cycle of this resonant action—which is equal to the retrace time—the voltage induced in the yoke is of such a polarity to cause a reversal of current flow in the switch as compared to the current flow resulting from the D.-C. source. The switch then acts to place the inductor again across the battery so that the inductor discharges through the battery. Because the inductor voltage goes only slightly greater than the battery voltage due to this switching action, there is a linear decrease in current through the yoke equal to the rate of change of the previously mentioned increase of current. After the current decreases to zero the switch maintains the battery across the yoke so that the aforementioned linear current rise then occurs. The linear decrease of current followed by the linear increase—both at approximately the same rate of change—produces the linear slope required for a sawtooth wave.

Several oscillatory switch embodiments are disclosed. All of them utilize transistors for the switching action. In one embodiment, a single PNPN transistor is connected as a relaxation oscillator so that its collector circuit produces the switching action of placing the battery across the yoke to cause a charging of the yoke. A rectifier placed in shunt with the collector circuit provides the discharge path for the yoke. In another embodiment, a PNPN transistor relaxation oscillator provides a substantially trapezoidally-shaped wave to drive another transistor that produces both switching actions for the yoke. It will be shown that the "switch" transistor is most efficiently operated if it has a trapezoidally-shaped input wave. The relaxation oscillator is such that it can be synchronized with synchronization pulses or with an AFC voltage so that it causes the switching operation at the desired deflection rate and at the correct times.

Figure 3:
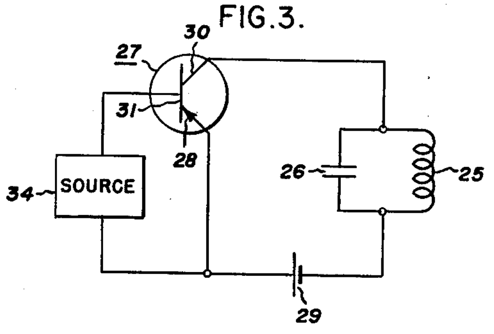
Figure 4A:
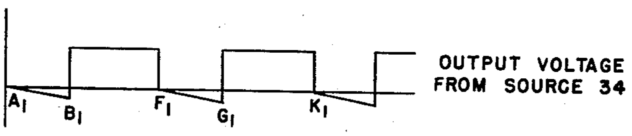
Figure 4B:
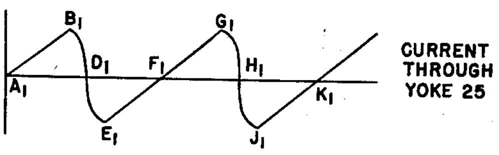
Figure 5:
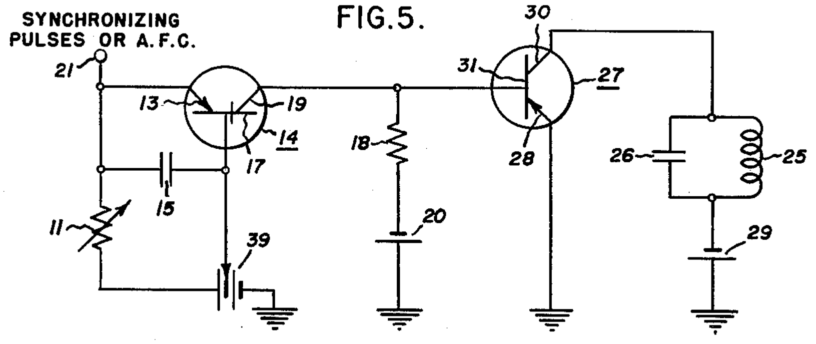
Figure 6:
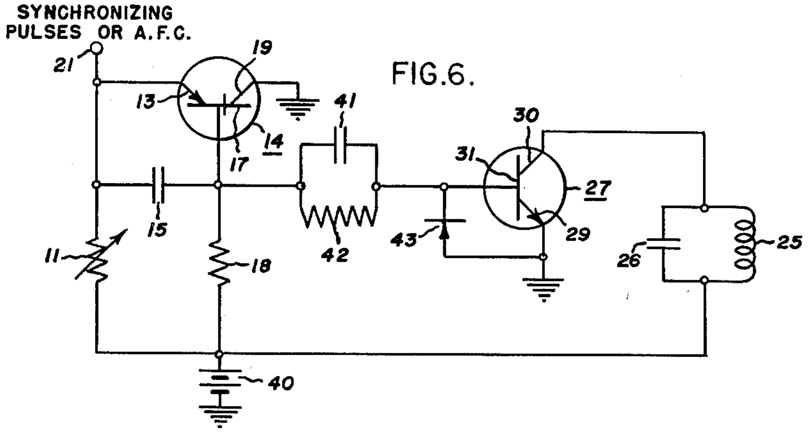
Figure 7:
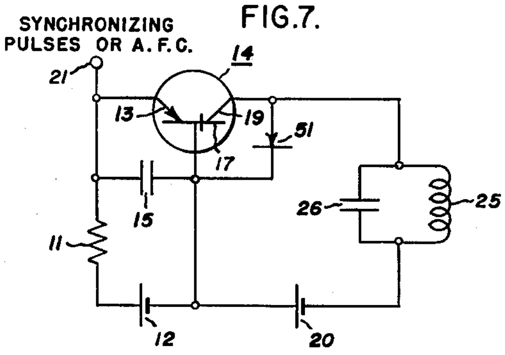

The manner in which the above objectives, advantages and features of this invention can be attained in accordance with the principles of this invention will be better understood after detailed consideration of the drawings in which:

FIG. 1 is a circuit diagram of one PNPN transistor relaxation oscillator that can be utilized in the present invention, FIG. 2 is a group of waveforms of voltages occurring at various points in the oscillator circuit of FIG. 1, FIG. 3 is a circuit diagram of a suitable transistorized deflection system that can be used in the present invention, FIG. 4 are waveforms that occur at various points in the circuit of the deflection system of FIG. 3, FIG. 5 is one embodiment of the present invention that utilizes two transistors, FIG. 6 is another embodiment of the present invention that utilizes two transistors, and FIG. 7 is an embodiment of the present invention that utilizes only one transistor.

In FIG. 1 there is shown a typical PNPN transistor relaxation oscillator that can be employed in the present invention. In this oscillator circuit there is a charge rate control resistor 11 that is connected to the positive terminal of source 12 at one end and to the emitter 13 of the PNPN transistor 14 at the other end. A charging capacitor 15 is joined between the emitter 13 and the base 17 of transistor 14. A load resistor 18 interconnects collector 19 and the negative terminal of source 20. Source 12 is poled to bias the emitter 13 in the forward direction and source 20 is poled to bias collector 19 in the forward direction. Thus, transistor 14 is biased in the conjugate emitter or hook collector mode.

Figure 2A:
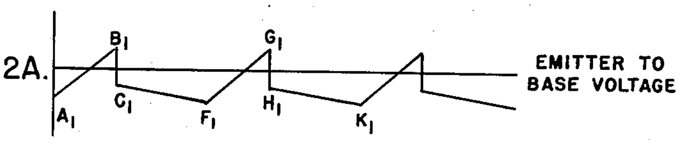
Figure 2B:
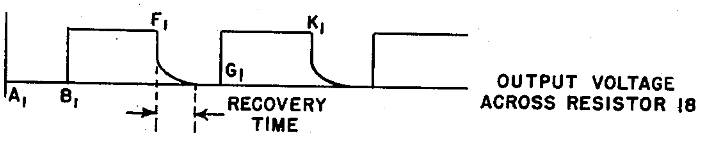

The voltage waveforms of FIGS. 2A and 2B indicate the circuit operation of this oscillator. FIG. 2A shows the emitter to base voltage, i.e. the voltage across capacitor 15, and FIG. 2B shows the output voltage across resistor 18. A cycle of operation can be considered to begin with the exponential charging of capacitor 15 through resistor 11 by a current from battery 12 as is shown between points $A_1$ and $B_1$ of FIG. 2A. At point $B_1$ the emitter to base voltage has become sufficiently positive for the transistor to conduct and conduction occurs. With a low resistance path between emitter 13 and base 17, resulting from conduction, capacitor 15 discharges initially at a rapid rate—between points $B_1$ and $C_1$—and then as the voltage decreases, at a moderate rate—as is shown between points $C_1$ and $F_1$. At point $F_1$ conduction ceases and the cycle repeats.

As is well known, when the transistor conducts, and only then, there is a low impedance path between the collector and the base for a PNPN transistor. With a low impedance path between base 17 and collector 19, practically all of the voltage of source 20 is connected across resistor 18. This voltage occurs for the time between points $B_1$ and $F_1$ of FIG. 2B. One might expect that with cessation of conduction in the emitter circuit at point $F_1$ and there would be a simultaneous cessation of current flow in the collector circuit. As can be noted from FIG. 2B, which also shows current flow, this is not the case, although the collector current is severely reduced at this point. After the emitter circuit shuts off there is a sudden decrease of current in the collector circuit and then a gradually decreasing flow of current for a time termed the recovery time.

The frequency of operation of the oscillator of FIG. 1 is determined by the value of the capacitance of capacitor 15, of the resistance of resistor 11, and of the value of voltage source 12. Resistor 11 can be of the variable type thereby permitting adjustment of the oscillator frequency. Frequency control can be effected by introducing positive or negative synchronizing pulses at terminal 21 or by the application of an AFC voltage either in series or in parallel with the emitter circuit.

Figure 2C:
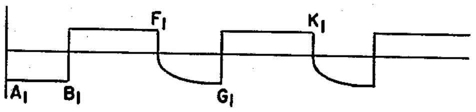

The details of the relaxation oscillator of FIG. 1 are not a part of the present invention. The above brief description of this oscillator has been presented so that when it is referred to in a later discussion, its operation will be understood. The most important feature of this oscillator is, of course, its output curve of FIG. 2B. The significance of this curve is that there are periodically recurring trapezoidal portions such as is between points $F_1$ and $G_1$. It should be noted that if FIG. 2B is biased so that the curved portions of the "trapezoids" of FIG. 2B are negative, the negative portions resemble a sawtooth wave. Of course during the transitory period when the oscillator is first switched on, the output across resistor 18 is not a trapezoid but more closely resembles a rectangle, as is shown in the left of FIGS. 2B and 2C. But in a short time the transients die down and the trapezoidal wave is produced.

A deflection system employing a transistor is shown in FIG. 3. This circuit is especially utilizable for the horizontal deflection system of a television receiver. The horizontal deflection rate is so high that the inductive reactance of the yoke is quite high as compared to the resistance. This inductive reactance is important in the circuit of FIG. 3 because it aids in the production of the sawtooth wave required for the deflection yoke. The deflection yoke 25 and a capacitor 26 are connected in parallel to form a parallel resonant circuit. The values for the inductance of yoke 25 and for the capacitance of the capacitor 26 are selected so that half a period of the resonant cycle is approximately equal to the retrace time. In some applications the distributed capacitance of yoke 25 may be enough to provide such a tuned circuit. Then, of course, a lumped capacitor is not required. The transistor for this deflection circuit is shown to be a PNP junction transistor 27 having a common emitter 28 that is joined to the positive terminal of battery 29, a collector 30 connected to one end of yoke 25, and a base 31 that is joined to one terminal of input voltage source 34.

The details of this deflection circuit are not a part of the present invention and are, in fact, the subjesct matter of another patent application—Deflection Circuit, S.N. 533,200, filed September 8, 1955, now Patent No. 2,924,-744. However, a knowledge of the fundamentals of this circuit is necessary. FIG. 4A, which is the ideal input waveform from source 34, and FIG. 4B which is the resulting current in yoke 25, will be referred to in the explanation of the operation of this circuit.

The zero voltage line (abscissa) in FIG. 4A represents the voltage at which the emitter 28 has sufficient forward voltage to cause conduction in the transistor. At time $A_1$ the voltage produced by source 34 is sufficient to produce saturation in transistor 27, which means that, in effect, there is a short circuit between emitter 28 and collector 30. With the exception of the small voltage drop in the transistor, the voltage of source 29 is then placed across yoke 25. The current through yoke 25—neglecting this small voltage drop—is then $E=L\ di/dt$, wherein E is the voltage of source 29, L is the inductance of yoke 25, and $di/dt$ is the rate of change of current through yoke 25. Because E and L are constant, $di/dt$ is constant which means that the current rises linearly in yoke 25 as is shown between points $A_1$ to $B_1$ of FIG. 4B. When the current through the collector circuit rises, the current in the emitter circuit must likewise rise if saturation is to be maintained. Thus, the voltage output from source 34 must rise as is shown between points $A_1$ and $B_1$ of FIG. 4A.

The voltage produced by source 34 continues to rise—in a negative sense—until the time at point $B_1$. Then source 34 suddenly changes the emitter voltage to a value on the non-conduction side of the abscissa of FIG. 4A thereby cutting off conduction in transistor 27 and therefore the yoke current flow through the collector circuit. As is characteristic of inductors, when the current flow through yoke 25 starts to decrease, the inductance of yoke 25 starts acting as a generator in an effort to maintain the current flow. The energy for the operation of this generator comes from the collapse of the existing magnetic field of the inductor. The generated current flows to capacitor 26 in decreasing amounts until at the time corresponding to point $D_1$ of FIG. 4B when the energy that was stored in the magnetic field of yoke 25 has been transferred to the electrostatic field of capacitor 26. At point $D_1$ capacitor 26 then starts discharging through inductor 25, in typical resonant circuit fashion, in the reverse direction from the charging current flow. This current increases until the time corresponding to point $E_1$, at which time the voltage induced in yoke 25 is sufficient to forward bias the collector circuit thereby causing conduction between the collector 30 and base 31 diode and also to some extent between collector 30 and emitter 28, even though the voltage produced by source 34 is not sufficient to bias the emitter circuit on. In effect then a low resistance path (assuming the impedance of source 34 is small) is formed between collector 30 and the positive terminal of source 29. The voltage of yoke 25 and the voltage of source 29 are bucking so energy flows from the yoke to the source. Because the voltage of source 29 is fixed, the voltage generated across yoke 25 exceeds the voltage of source 29 only by the voltage drop across the collector to base diode and across source 34, which is very small. Thus, for the discharge time of yoke 25 the equation $E=L\ di/dt$ is valid wherein E is only slightly greater than the voltage of source 29. Thus, the rate of change of current through yoke 25 from points $E_1$ and $F_1$ is only slightly greater than the rate of change from points $A_1$ to $B_1$. For practical purposes, the current wave in yoke 25 is a sawtooth wave.

Perhaps it is not apparent why the trapezoidal wave of FIG. 4A is the most efficient form. It must be remembered that the only purposes of this wave are to provide saturation and cutoff. If the wave from source 34 were greater at any point during the saturation times, than the wave of FIG. 4A, the excess current resulting from the excess voltage would flow from the emitter to base and cause a consumption of energy in the resistor formed therebetween. On the other hand, if a wave were selected having a value that is less at any point than the wave of FIG. 4A, during these times, then there wouldn't be saturation at all points between $A_1$ and $B_1$, $F_1$ and $G_1$ etc., and the current wave through yoke 25 during the times corresponding to these points would not be linearly increasing. A sawtooth wave could do the above as well as a trapezoidal wave. But a trapezoidal can also provide cutoff. The positive extremities of the wave of FIG. 4A, which differentiate this wave from a sawtooth wave, are desirable because they guarantee cutoff.

Because the relaxation oscillator of FIG. 1 produces a close approximation to a trapezoidal output, and because a trapezoidal wave is the best input for the deflection driver of FIG. 3, it would be desirable to have the relaxation oscillator of FIG. 1 drive the transistor of FIG. 3. FIG. 5 shows such a circuit. The reference numerals for the components of FIG. 5 are the same as for the corresponding components of FIGS. 1 and 3 with the exception of source 39 which provides a positive potential for base 17 and a greater positive potential for emitter 13 so that this emitter is biased in the forward direction.

Referring now to FIGS. 2C and 4B to explain the operation of the FIG. 5 embodiment, between the times corresponding to points $F_1$ and $G_1$ of both curves, the recovery time current in the collector circuit of transistor 14 is decreasing. This decreasing current, which causes a decreasing voltage drop across resistor 18, results in the base 31 of transistor 27 becoming more negative with respect to emitter 28. This result should be evident from the fact that the voltage drop across resistor 18 bucked the negative potential of source 20. As the bucking voltage across resistor 18 decreases, then of course the potential of source 20 more and more predominates. The increase of this forward biasing potential causes the current to increase in the emitter circuit of transistor 27. Due to the almost trapezoidal shape of waveform 2C between points $F_1$ and $G_1$, the increase in current in the emitter circuit of transistor 27 is only slightly more than enough to produce saturation. The voltage from source 29 is then applied almost totally across yoke 25 by means of the path through source 20, resistor 18, and the portion of transistor 27 between base 31 and collector 30. Thus, there is a linear current build up in yoke 25 as can be seen in FIG. 4B between points $F_1$ and $G_1$. At point $G_1$ capacitor 15 has acquired sufficient voltage to discharge between emitter 13 and base 17 of transistor 14 causing conduction of this transistor. The collector to base path of transistor 14 is then a very low impedance and as a result, the positive voltage on base 17 is applied almost totally to base 31 of transistor 27. This biases the emitter circuit of transistor 27 in the reverse direction thereby cutting off the current flow in the collector circuit. Then between points $G_1$ and $H_1$ of FIG. 4B, the inductance of yoke 25 converts its magnetic field into current that charges capacitor 26. Between points $H_1$ and $J_1$, capacitor 26 discharges into inductor 25. And then between points $J_1$ and $K_1$ the inductor discharges into the collector to base diode of transistor 27 and the cycle is completed. Of course transistor 27 can be operated as a common base transistor but then the circuit of transistor 14 would have to be changed to produce a positive trapezoid. Such changes are well known and are within the realm of one who is skilled in the art.

A deflection circuit utilizing an NPN transistor is shown in FIG. 6. The components of this circuit have corresponding components in the embodiments of FIGS. 1 and 3 and the components are numbered accordingly. In FIG. 6, however, there is only one source 40, and there has been added a diode 43 and a parallel combination of a capacitor 41 and resistor 42. The parallel combination is joined between the base 17 of transistor 14 and the base 31 of transistor 27. Diode 43 is joined between the base 31 and the emitter 29 of transistor 27. During time $F_1$ to $G_1$ of curve 2C the current in the collector to base circuit of transistor 14 starts to decrease and thus the voltage drop across resistor 18 decreases. This voltage drop bucks the positive potential from source 40 and thus with a decrease of the bucking voltage more and more of the positive potential of source 40 appears at the connection between resistor 18 and the parallel combination of resistor 42 and capacitor 41. There will also be a bucking voltage across resistor 42 resulting from the discharge of capacitor 41. When the voltage drop across resistor 18 decreases sufficiently during the recovery time period, the positive potential of source 40 overcomes the bucking voltages across resistors 18 and 42 to forward bias the emitter circuit of transistor 27, thereby causing saturation in the collector circuit of transistor 27. At point $G_1$ when transistor 14 starts conducting, there is a virtual short circuit between collector 19 and base 17 which means that ground potential appears at the junction of resistor 18 and 42. The potential across capacitor 41 due to the voltage drop that appeared across resistor 42 during the conduction of transistor 27 is such as to reverse bias the base-emitter diode of transistor 27 thereby turning "off" transistor 27. Between points $G_1$ and $H_1$ of FIG. 4B the inductance of yoke 25 causes a charging current flow to capacitor 26. During points $H_1$ and $J_1$ capacitor 26 causes a current flow to inductor 25. Then at point $J_1$ the voltage generated in the inductance of yoke 25 causes current to flow from collector 30 to base 31. Due to the presence of resistor 42 and 18 this current does not have a low impedance path to ground, and thus rectifier 43 is provided to shunt these resistors and to provide a low impedance to ground for this current. This current flows during the times corresponding to points $J_1$ and $K_1$ and the cycle starts again. Although this circuit has been described as utilizing a NPN transistor, those skilled in the art will appreciate that a PNPN transistor biased for remote base operation is equally suitable.

Of course it would be advantageous to have a deflection system in which a single transistor was not only the oscillator but was also the driving element. FIG. 7 shows such a system. Circuit operation depends upon the switching action in the collector circuit of transistor 14 as it functions as a relaxation oscillator. Periodically the collector-base path becomes virtually a short circuit between points $B_1$ and $F_1$ of FIG. 2B. During this time the supply voltage 20 is connected across the deflection yoke 25 and current increases in yoke 25 at a linear rate, as previously explained. At point $F_1$, when capacitor 15 has finished discharging, transistor 14 suddenly becomes nonconducting and yoke current flows into and out of capacitor 26 in an oscillator fashion, as previously explained. At the end of one-half cycle of the oscillatory period (point $J_1$) the voltage generated in yoke 25 is such as to cause diode 51 to conduct. The conduction in diode 51 reconnects yoke 25 to the supply voltage source 20 so that the voltage generated in yoke 25 is only slightly greater than the voltage of source 20. Thus the rate of change of current is substantially the same as it was during the portion of the deflection cycle when source 20 supplied the current. Completion of the period occurs when the yoke current has returned to zero—point $K_1$.

Although I have illustrated particular embodiments of my invention, it will of course be understood that I do not wish to be limited thereto, since various modifications, both in the circuit arrangement and in the instrumentalities, may be made and I contemplate by the appended claims to cover any such modifications as fall within the true spirit and scope of the invention.

What I claim as new and desire to secure by Letters Patent of the United States is:

1. A deflection system for a cathode ray tube, said system comprising: a source of fixed potential, a tuned circuit including a deflection yoke, a first transistor connected to provide a switching action between said source of D.-C. potential and said yoke, and a transistor-oscillator circuit including a three junction, three connection transistor having recovery-time current flow characteristics connected to bias said first transistor off when said second transistor is on and in which the recovery time current flow is used to provide a gradually increasing forward bias for said first transistor.

2. A deflection system for a cathode ray tube, said system comprising: a source of D.-C. potential, a tuned circuit including a deflection yoke, a first transistor having three electrodes and connected so that when a trapezoidal input is applied to said transistor said transistor provides a low impedance path for the discharge of the inductive energy of said yoke into said D.-C. potential source, and a transistor oscillator including a three junction, three connection transistor for providing a trapezoidal input to said first transistor.

3. The deflection system of claim 2 wherein said transistor oscillator is a relaxation oscillator.

4. The deflection system of claim 3 wherein said relaxation oscillator utilizes a PNPN transistor biased in the conjugate emitter mode.

5. An electromagnetic deflection system for a cathode ray tube, said system comprising: a source of D.-C. potential; a tuned circuit including a deflection yoke; a first transistor having three electrodes and connected so that when a trapezoidal input is applied to said first transistor it provides a low impedance path for the flow of current from said source through two of said electrodes to said yoke, and at other times when the voltage inductively generated in said yoke exceeds that of said source, it provides a discharge path for said yoke through two of its electrodes at least one of which is different from said other two electrodes; a PNPN transistor relaxation oscillator biased in the conjugate emitter mode; and means connecting the output of said relaxation oscillator to the input of said first transistor.

6. An electromagnetic deflection system for a cathode ray tube, said system comprising: a relaxation oscillator including a PNPN transistor, a diode connected in shunt across the output of said transistor, and a tuned circuit including a deflection yoke connected in the output of said transistor.

7. The deflection system of claim 6 wherein said PNPN transistor is biased in the conjugate emitter mode.

8. An electromagnetic deflection system for a cathode ray tube, said system comprising: a PNPN transistor having an emitter, a base, and a collector; a source of positive D.-C. potential for forward biasing said emitter; a resistor connected between said source of positive potential and said emitter; a capacitor connected between said emitter and base; a source of negative potential for forward biasing said collector; a turned circuit including a deflection yoke connected in series with said source of negative potential between said base and said collector; and a diode connected between said collector and said base to provide a conductive path when a positive voltage is applied to said collector.

9. An electromagnetic deflection system for a cathode ray tube, said system comprising: a source of D.-C. voltage; a tuned circuit including a deflection yoke; an oscillator including a three junction three connection transistor connected to periodically provide a low impedance path for current from said source through said deflection yoke; and means for providing a low impedance path across the output of said oscillator for current resulting from a voltage inductively generated in said deflection yoke, said path existing when said inductively generated voltage exceeds the voltage from said source of D.-C. voltage.

10. The electromagnetic deflection system of claim 9 wherein said oscillator comprises: a PNPN relaxation oscillator biased in the conjugate emitter mode and connected to produce a trapezoidal output, and a drive transistor having three electrodes for providing a low impedance path through two of its electrodes in response to the trapezoidal output from said relaxation oscillator; and wherein said means for providing a low impedance path comprises: a path through two electrodes of said drive transistor wherein one of said electrodes is different than said afore-mentioned two electrodes.

11. The electromagnetic deflection system of claim 9, wherein said oscillator comprises a relaxation oscillator including a PNPN transistor having three electrodes for periodically providing a low impedance path between two of its electrodes; and wherein said means for providing a low impedance path comprises a rectifier connected in shunt with said two electrodes.

12. An electromagnetic deflection system for a cathode ray tube, said system comprising: a relaxation oscillator including a PNPN transistor biased in the conjugate emitter mode, a tuned circuit including a deflection yoke, a source of D.-C. potential, a drive transistor connected to provide switching action between said source of D.-C. potential and said deflection yoke, a rectifier connected to provide a shunt path for discharge current from said yoke, and a parallel resistor-capacitor combination connected between the output of said relaxation oscillator and the input of said drive transistor.

References Cited in the file of this patent

UNITED STATES PATENTS

| | | |
|---|---|---|
| 2,679,594 | Fromm | May 25, 1954 |
| 2,745,038 | Sziklai | May 8, 1956 |
| 2,760,070 | Keonjian | Aug. 21, 1956 |
| 2,820,145 | Wolfendale | Jan. 14, 1958 |
| 2,825,813 | Sperling | Mar. 4, 1958 |
| 2,847,569 | Finkelstein | Aug. 12, 1958 |

OTHER REFERENCES

Wallace et al.: "High-Frequency Transistor Tetrode," Electronics, vol. 26, No. 1, January 1953, pp. 112 and 113.

"Symposium of the Application of Transistors to Military Electronics," Yale University, September 1953, Proceedings, pp. 47 and 48.

Shea: "Principles of Transistor Circuits," John Wiley & Sons, 1955, pp. 286 to 289.

Schwartz: "Transistor Characteristics for Circuit Designers," Electronics, vol. 29, No. 1, January 1956, page 174.